US010230553B2

(12) United States Patent
Liang et al.

(10) Patent No.: US 10,230,553 B2
(45) Date of Patent: *Mar. 12, 2019

(54) EMBEDDED WIRE FEED FORWARD EQUALIZATION

(71) Applicant: International Business Machines Corporation, Armonk, NY (US)

(72) Inventors: Thomas W. Liang, Rochester, MN (US); Matthew S. Doyle, Chatfield, MN (US); John R. Dangler, Rochester, MN (US); Manuel Orozco, Rochester, MN (US); Layne A. Berge, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/494,189

(22) Filed: Apr. 21, 2017

(65) Prior Publication Data

US 2017/0222837 A1   Aug. 3, 2017

Related U.S. Application Data

(63) Continuation of application No. 15/004,851, filed on Jan. 22, 2016.

(51) Int. Cl.
*H04L 25/03* (2006.01)
*H01P 11/00* (2006.01)
*H01P 3/00* (2006.01)

(52) U.S. Cl.
CPC ........ *H04L 25/03076* (2013.01); *H01P 3/003* (2013.01); *H01P 11/001* (2013.01);
(Continued)

(58) Field of Classification Search
CPC ..... H04L 25/03076; H04L 2025/03433; H01P 3/003; H01P 11/001
(Continued)

(56) References Cited

U.S. PATENT DOCUMENTS 3,087,126 A    4/1963  Szckuka
4,423,463 A *  12/1983 Serradimigni ........... H01G 4/32
                                                29/25.42
(Continued)

OTHER PUBLICATIONS

U.S. Appl. No. 15/004,851 entitled, "Embedded Wire Feed Forward Equalization,", filed Jan. 1, 2016.

*Primary Examiner* — Stephen E. Jones
*Assistant Examiner* — Samuel S Outten
(74) *Attorney, Agent, or Firm* — Patterson + Sheridan, LLP

(57) ABSTRACT

Embodiments of the present disclosure provide methods and apparatus for providing feed forward equalization to a communication line by providing a resistance and a capacitance to the communication line. The method includes determining the resistance based on a desired value of feed forward equalization to provide to a communication line, determining the capacitance based on the desired value of feed forward equalization to provide to the communication line, providing a layer of resistive material between a first conductor and a second conductor of the communication line, wherein a dimension of the layer of resistive material is determined based on the determined resistance and providing a layer of dielectric material between the first conductor and the second conductor, wherein a dimension of the layer of dielectric material is determined based on the determined capacitance.

15 Claims, 9 Drawing Sheets

(52) U.S. Cl.
CPC ............... *H04L 25/03885* (2013.01); *H04L 2025/03433* (2013.01)

(58) Field of Classification Search
USPC ...................................... 333/28 R
See application file for complete search history.

(56) References Cited

U.S. PATENT DOCUMENTS

| | | |
|---|---|---|
| 6,756,309 B1 | 6/2004 | Chen et al. |
| 7,432,776 B2 | 10/2008 | Kwong et al. |
| 7,989,337 B2 | 8/2011 | Aguado Granados et al. |
| 8,608,900 B2 | 12/2013 | Buchberger, Jr. et al. |
| 2003/0141942 A1 | 7/2003 | McMorrow et al. |
| 2006/0009185 A1 | 1/2006 | Shamsaifar et al. |
| 2009/0051458 A1 | 2/2009 | Miller et al. |
| 2013/0002378 A1 | 1/2013 | Wu et al. |
| 2015/0197063 A1 | 7/2015 | Shinar et al. |
| 2015/0237722 A1 | 8/2015 | Hwu et al. |

\* cited by examiner

EMBEDDED WIRE FEED FORWARD EQUALIZATION

This application is a continuation of co-pending U.S. patent application Ser. No. 15/004,851, filed Jan. 22, 2016. The aforementioned related patent application is herein incorporated by reference in its entirety.

BACKGROUND

Field of the Invention

Embodiments of the present disclosure relate to a communication wire, and more specifically, to embedding resistance and capacitance in a wire to supply feed forward equalization.

Description of Related Art

When signals (e.g., digital data transmissions) are transmitted over wires or printed circuit board (PCB) traces, nonlinear frequency response and loss characteristics of the media can degrade signal quality to the point that the signal is not successfully transmitted. Equalization is a signal processing technique to improve signal quality to meet interface margin requirements and allow a receiver to correctly interpret a received signal.

In any electronic interface situation wherein existing transceiver equalization is not sufficient to meet interface margin requirements, electrical margin-enhancement techniques are needed. One such technique is called Feed Forward Equalization (FFE), also known as linear feedforward equalization (LFE). When a signal is transmitted over a wire, it typically includes a direct current (DC) component and an alternating current (AC) component. A wire tends to suppress the AC component more than the DC component. The suppression of the AC component may result in poor signal quality and negatively impact receiver performance and communication throughput of the communication link on the wire. To compensate for the difference in suppression of the AC component and the DC component by a wire, FFE functionality may be provided (e.g., with additional parts or changes to driver software) to a transmitter. The FFE functionality provides an amount of DC component suppression, thereby improving signal quality and channel margin.

SUMMARY

Certain embodiments of the present disclosure generally provide an apparatus for providing feed forward equalization to a communication line by providing a predetermined resistance and a predetermined capacitance to the communication line. The apparatus generally includes a first conductor, a second conductor that does not contact the first conductor, a layer of resistive material in contact with the first conductor and in contact with the second conductor, wherein the layer of resistive material has the predetermined resistance, and a first layer of dielectric material in contact with the first conductor and in contact with the second conductor, wherein the second layer, the first conductor, and the second conductor in combination form a capacitor having the predetermined capacitance.

Certain embodiments of the present disclosure generally provide a method for providing feed forward equalization to a communication line by providing a resistance and a capacitance to the communication line. The method generally includes determining the resistance based on a desired value of feed forward equalization to provide to a communication line, determining the capacitance based on the desired value of feed forward equalization to provide to the communication line, providing a layer of resistive material between a first conductor and a second conductor of the communication line, wherein a dimension of the layer of resistive material is determined based on the determined resistance, and providing a first layer of dielectric material between the first conductor and the second conductor, wherein a dimension of the first layer of dielectric material is determined based on the determined capacitance.

Certain embodiments of the present disclosure generally provide a method for manufacturing a communication line providing a desired value of feed forward equalization. The method generally includes determining a resistance based on the desired value of feed forward equalization, determining a capacitance based on the desired value of feed forward equalization, depositing a layer of resistive material between a first conductor and a second conductor of the communication line, wherein a dimension of the layer of resistive material is determined based on the determined resistance, and depositing a first layer of dielectric material between the first conductor and the second conductor, wherein a dimension of the first layer of dielectric material is determined based on the determined capacitance.

DETAILED DESCRIPTION

As mentioned above, signal quality of a signal transmitted via a wire or other conductor can be degraded due to the wire suppressing an AC component of the signal more than the wire suppresses the DC component of the signal. The suppression of the AC component can result in a reduced eye-width of the signal. If the eye-width is reduced enough, then the receiver may miss one or more transitions between bits, resulting in the receiver having errors in interpreting the signal and or the communication link failing entirely. Feed forward equalization functionality may be added to a transistor or receiver in a communication link. The feed forward equalization may be provided by specialized components in the transmitter and/or receiver, or by driver software used by the transmitter and/or the receiver.

When the length of a wire connecting a transmitter and receiver changes, the amount of feed forward equalization may need to be changed. If the feed forward equalization functionality is provided by components in a transmitter or receiver, then those components may require changing to provide the desired feed forward equalization. If the feed forward equalization functionality is provided by software used by the transmitter or receiver, then the software may require changing to provide the desired feed forward equalization. In some cases, no changes to the software can provide the desired feed forward equalization According to aspects of the present disclosure, a resistor (e.g., a layer of resistive material) and a capacitor (e.g., a layer of dielectric material combined with two conductors) may be embedded within a wire or other conductor and provide an amount of DC component suppression to the wire or other conductor and supply feed forward equalization functionality in the wire or other conductor. The resistor and capacitor may provide a more balanced frequency component (content) at a receiver, thereby improving signal quality and channel margin.

Figure 1:
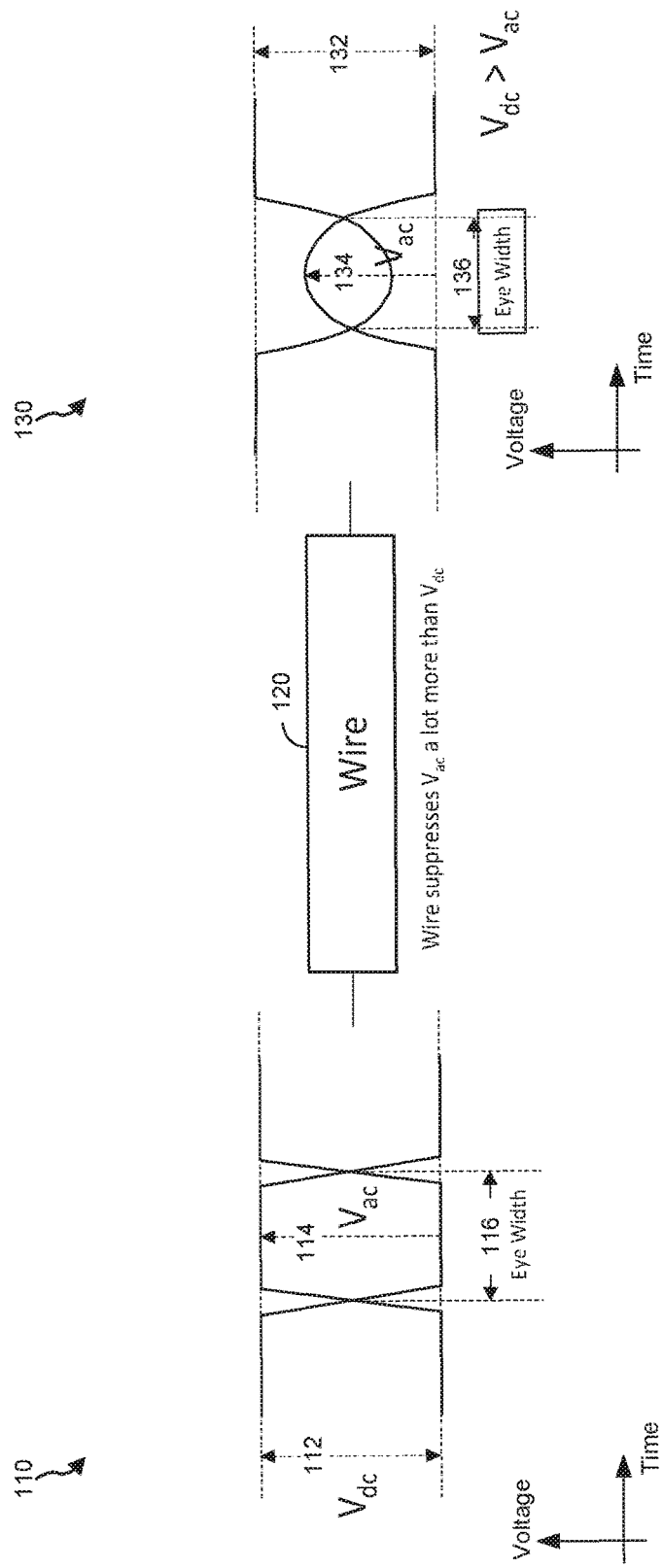
FIG. 1 illustrates an exemplary signal transmitted over a wire or other type of conductor.

FIG. 1 illustrates an exemplary signal transmitted over a wire or other type of conductor. The condition of the signal as the signal is transmitted is shown at 110. The signal traverses a wire 120 or other conductor, and the condition of the signal as the signal is received is shown at 130.

The transmitted signal 110 includes a DC component 112 and an AC component 114. As the signal at 110 has not yet traversed the wire 120, any nonlinear frequency response and loss characteristics of the wire have not yet affected the signal 110. Thus, an eye width 116 of the transmitted signal 110 as the signal is transmitted is nearly ideal.

The received signal 130 also includes a DC component 132 and an AC component 134. As the signal at 130 has traversed the wire 120, the wire has suppressed (e.g., due to nonlinear frequency response and loss characteristics of the wire) the AC component 134 of the signal 130 more than the wire has suppressed the DC component 132. Thus, because of the suppression of the AC component 134, an eye width 136 of the received signal 130 is reduced in comparison to the eye width 116 of the transmitted signal 110.

Figure 2:
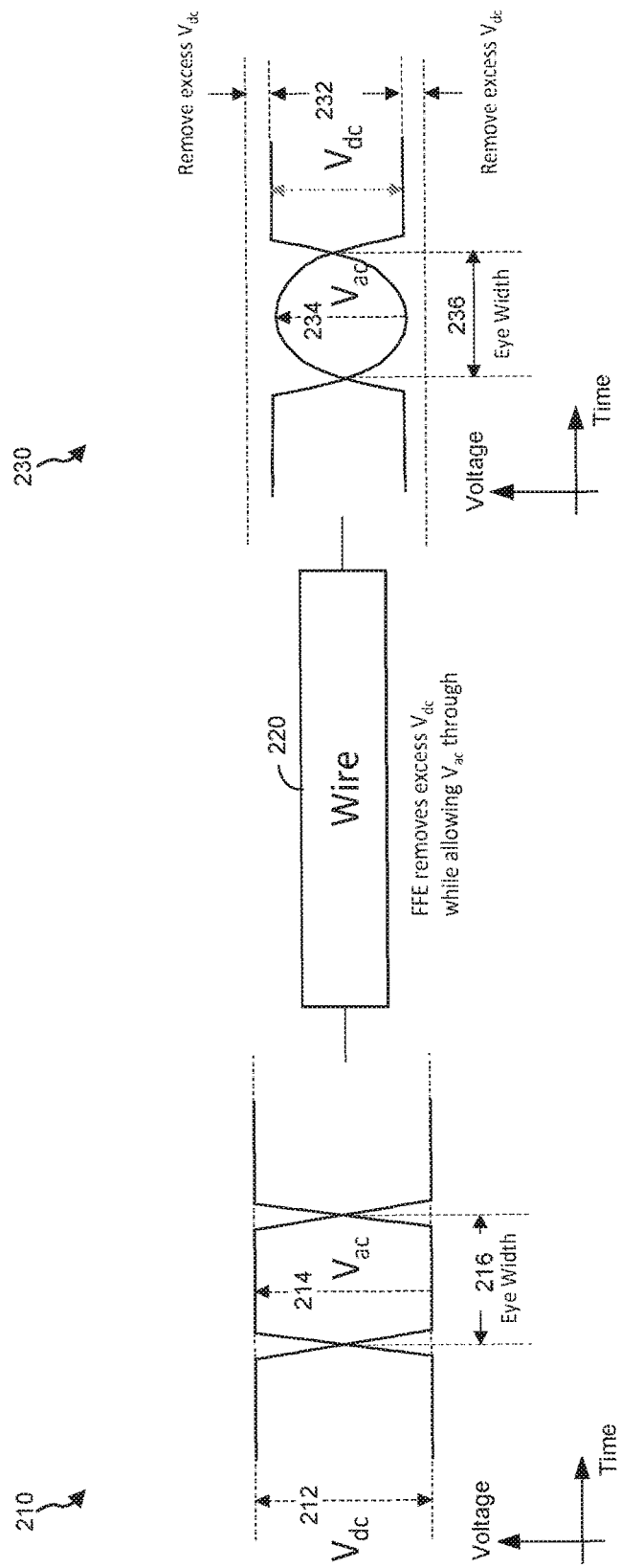
FIG. 2 illustrates an exemplary signal transmitted over a wire or other type of conductor that is an embodiment of the present disclosure.

FIG. 2 illustrates an exemplary signal transmitted over a wire or other type of conductor that is an embodiment of the present disclosure. The condition of the signal as the signal is transmitted is shown at 210. The signal traverses a wire 220 or other conductor that is an embodiment of the present disclosure, and the condition of the signal as the signal is received is shown at 230.

Similar to signal 110 in FIG. 1, the transmitted signal 210 consists of a DC component 212 and an AC component 214. Also similar to FIG. 1, the eye width 216 of the transmitted signal 210 as the signal is transmitted is nearly ideal.

When the signal traverses the wire 220 or other conductor that is an embodiment of the present disclosure, the DC component of the signal is suppressed by an embedded resistor (e.g., provided by a layer of resistive material) and an embedded capacitor (e.g., provided by a layer of dielectric material and two conductors). The embedded resistor and embedded capacitor are not shown and will be discussed in more detail below with reference to FIGS. 3 and 4. As before, the received signal 230 includes a DC component 232 and an AC component 234. As the signal at 230 has traversed the wire 220 or other conductor that is an embodiment of the present disclosure, the AC component 234 has been suppressed (e.g., due to nonlinear frequency response and loss characteristics of the wire). The embedded resistor and embedded capacitor suppress the DC component 232 more than the resistor and capacitor suppress the AC component 234. Thus, the eye width 236 of the received signal 230 may be similar to the eye width 216 of the transmitted signal 210.

Figure 3:
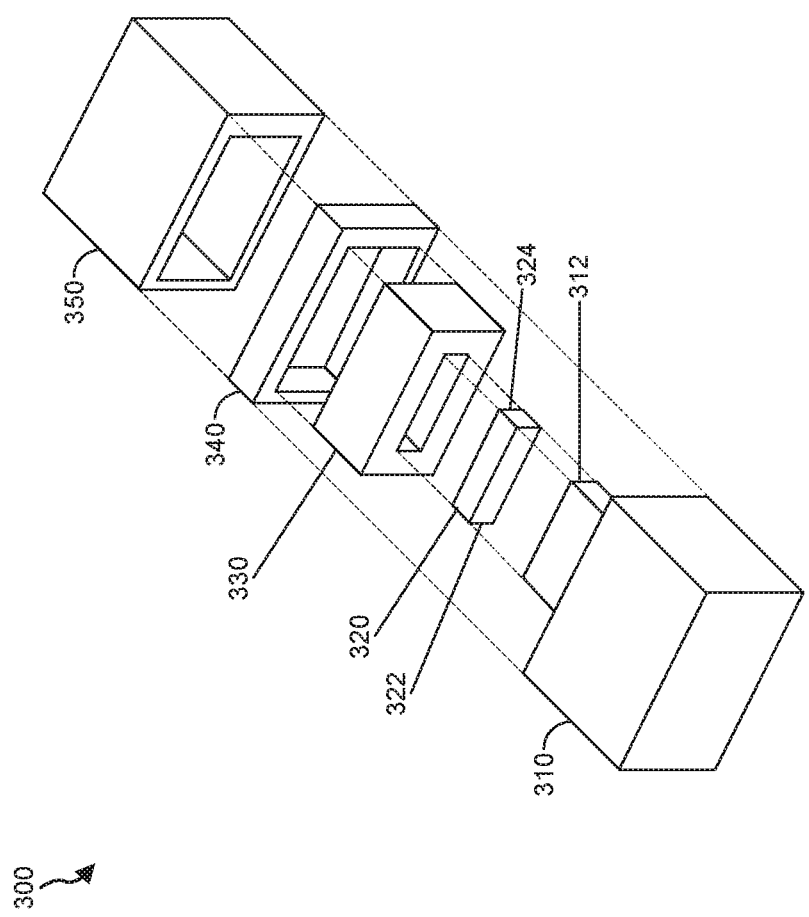
FIG. 3 is an exploded isometric view of an exemplary wire or other conductor that is an embodiment of the present disclosure.

FIG. 3 is an exploded isometric view of an exemplary wire 300 or other conductor that is an embodiment of the present disclosure. Wire 300 comprises a first conductor 310, a layer of resistive material 320, a layer of dielectric material 330, an insulator 340, and a second conductor 350.

The first conductor 310 and second conductor 350 may be made of copper or any suitably conductive material.

The layer of dielectric material 330, the insulator 340, and the layer of resistive material 320 prevent the first conductor 310 and second conductor 350 from directly contacting each other. Thus, any electrical signal introduced into the first conductor 310 may only reach the second conductor 350 by propagating through at least one of the layer of dielectric material 330, the insulator 340, and the layer of resistive material 320.

In the exemplary wire 300, a face 312 of the first conductor 310 contacts a face 322 the layer of resistive material 320. A second face 324 of the layer of resistive material contacts the second conductor 350. The first conductor 310, layer of resistive material 320, and second conductor 350 together form an electrically conductive path that suppresses DC components and AC components of electrical signals.

The resistance of the layer of resistive material 320 may be between ten and thirty ohms, for example, twenty ohms.

The insulator 340 is both non-conductive and has low dielectric properties, and thus may not conduct any electrical signal from the first conductor 310 to the second conductor 350.

The layer of dielectric material 330, first conductor 310, and second conductor 350 together form a capacitor. The capacitance of the formed capacitor may be between ten and thirty picofarads, for example, twenty picofarads. The capacitor acts to suppress DC components of electrical signals while not suppressing AC components of electrical signals. Thus, the AC component of a signal introduced into the first conductor 310 may reach the second conductor 350 by being propagated across the formed capacitor.

Figure 4:
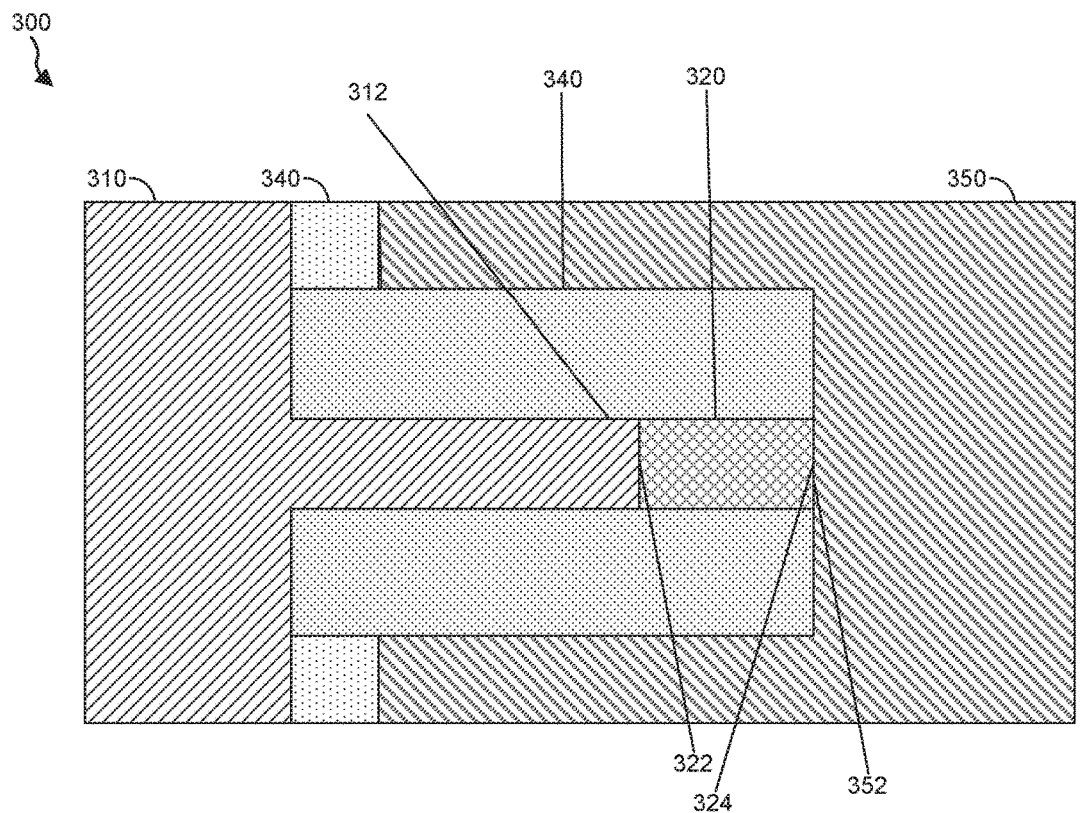
FIG. 4 illustrates a cutaway view of an exemplary wire or other conductor that is an embodiment of the present disclosure.

FIG. 4 illustrates a cutaway view of the exemplary wire 300. As illustrated, a second face 324 of the layer of resistive material 320 contacts the second conductor 350 on a face 352 of the second conductor.

The exemplary wire 300 may be assembled from components, or additionally or alternatively the wire or some of the components may be printed with a three-dimensional ("3-D") printer.

Figure 5:
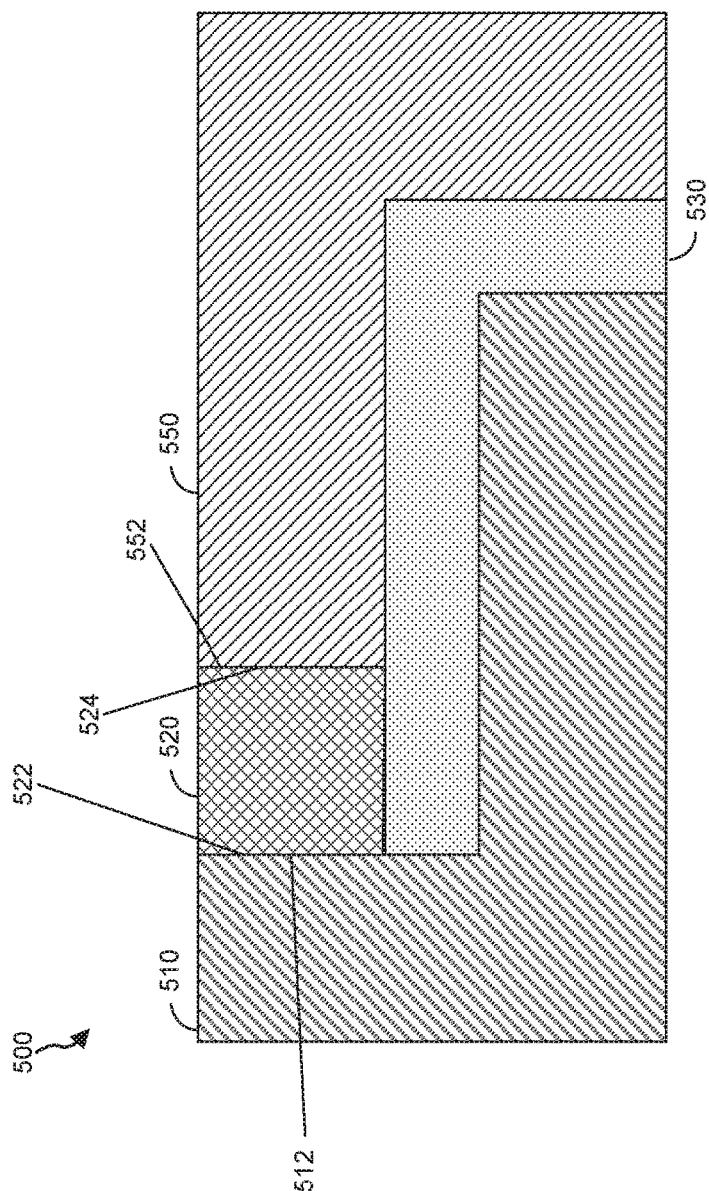
FIG. 5 illustrates a cutaway view of an exemplary wire that is an embodiment of the present disclosure.

FIG. 5 illustrates a cutaway view of an exemplary wire 500 that is an embodiment of the present disclosure. The exemplary wire 500 includes a first conductor 510, a layer of resistive material 520, a layer of dielectric material 530, and a second conductor 550.

The layer of dielectric material 530 and the layer of resistive material 520 prevent the first conductor 510 and second conductor 550 from directly contacting each other. Thus, any electrical signal introduced into the first conductor 510 may only reach the second conductor 550 by propagating through at least one of the layer of dielectric material 530 and the layer of resistive material 520.

In the exemplary wire 500, a face 512 of the first conductor 510 contacts a face 522 the layer of resistive material 520. A second face 524 of the layer of resistive material contacts a face 552 of the second conductor 550. The first conductor 510, layer of resistive material 520, and second conductor 550 together form an electrically conductive path that suppresses DC components and AC components of electrical signals.

The layer of dielectric material 530, first conductor 510, and second conductor 550 together form a capacitor. The capacitance of the formed capacitor may be, for example, twenty picofarads. The capacitor acts to suppress DC components of electrical signals while not suppressing AC components of electrical signals. Thus, the AC component of a signal introduced into the first conductor 510 may reach the second conductor 550 by being propagated across the formed capacitor.

The exemplary wire 500 may be assembled from components, or additionally or alternatively the entire wire or some components may be printed with a 3-D printer.

Figure 6:
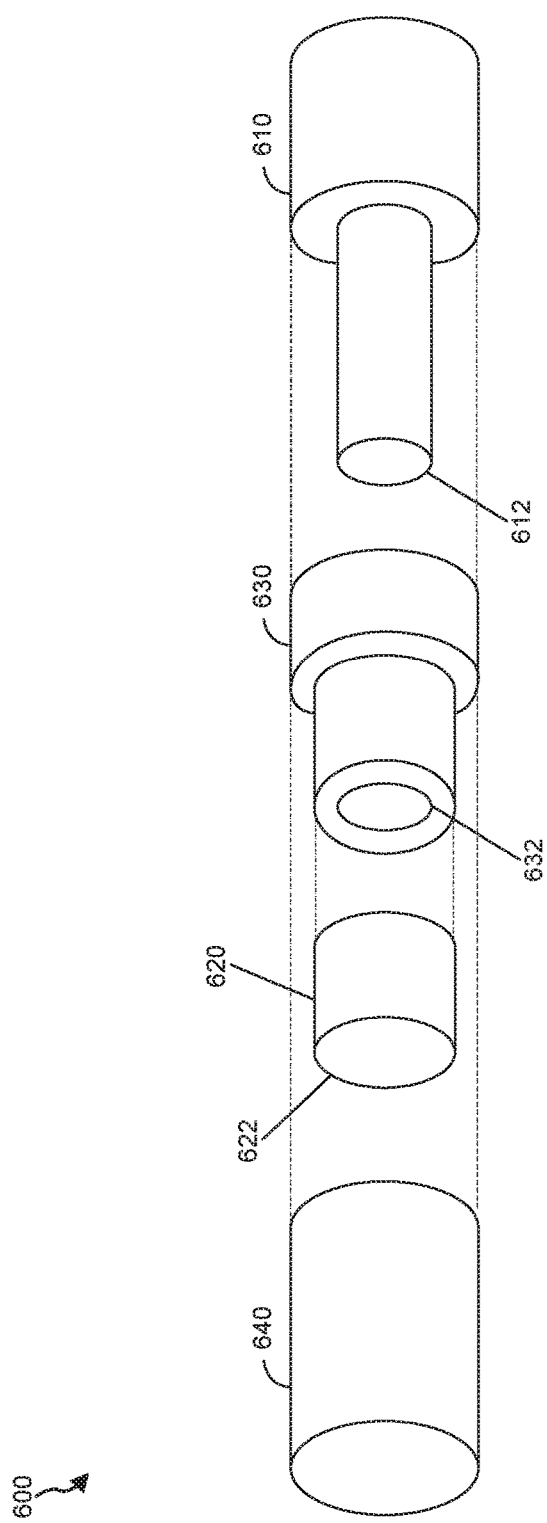
FIG. 6 is an exploded isometric view of an exemplary wire that is an embodiment of the present disclosure.

FIG. 6 is an exploded isometric view of an exemplary wire 600 that is an embodiment of the present disclosure. Wire 600 comprises a first conductor 610, a layer of resistive material 620, an insulator 630, and a second conductor 640.

The insulator 630 and the layer of resistive material 620 prevent the first conductor 610 and second conductor 640 from directly contacting each other. Thus, any electrical signal introduced into the first conductor 610 may only reach the second conductor 640 by propagating through at least one of the insulator 630 and the layer of resistive material 620.

In the exemplary wire 600, a face of the layer of resistive material 620 contacts a face 612 of the first conductor 610. A second face 622 of the layer of resistive material contacts a face of the second conductor 640, while sides of the layer of resistive material may also contact the second conductor 640. The first conductor 610, layer of resistive material 620, and second conductor 640 together form an electrically conductive path that suppresses DC components and AC components of electrical signals.

The insulator 630 is both non-conductive and has high dielectric properties, and thus forms a capacitor with the first conductor 610 and the second conductor 640. The capacitance of the formed capacitor may be, for example, twenty picofarads. As in the exemplary wire 300 and the exemplary wire 500, the capacitor acts to suppress DC components of electrical signals while not suppressing AC components of electrical signals.

Figure 7:
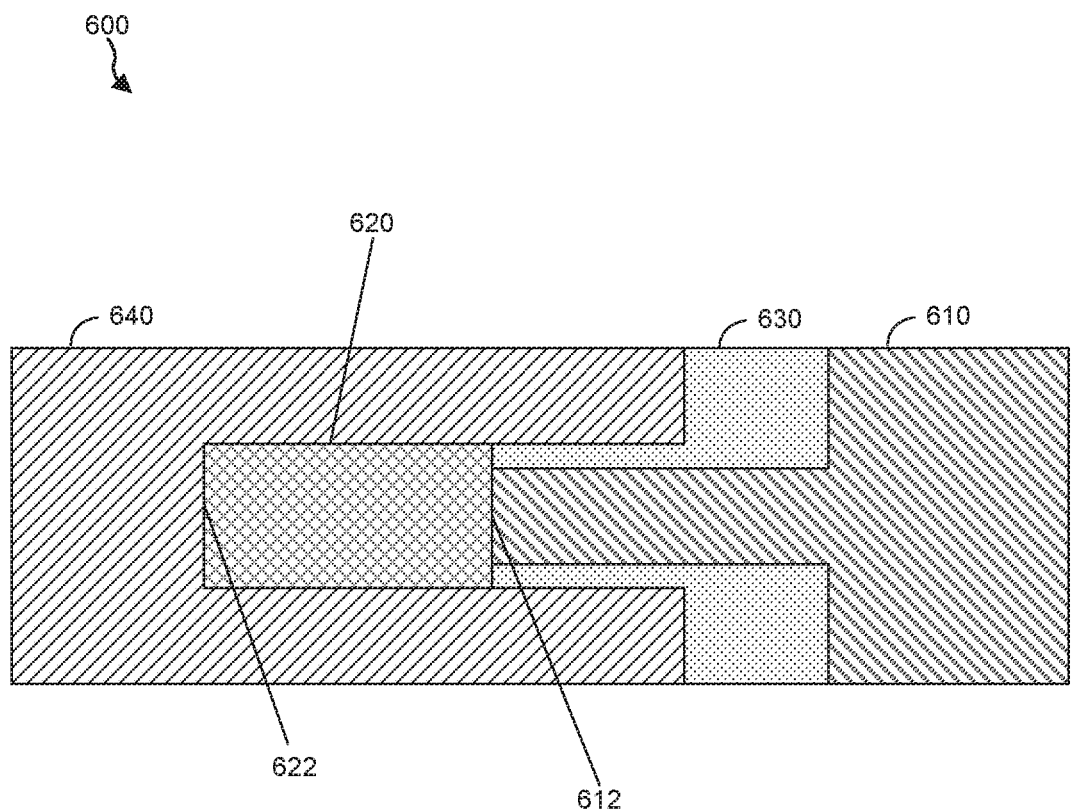
FIG. 7 illustrates a cutaway view of an exemplary wire or other conductor that is an embodiment of the present disclosure.

FIG. 7 illustrates a cutaway view of the exemplary wire 600. As illustrated, the first conductor 610 is in contact with the layer of resistive material 620, which is in contact with the second conductor 640.

The exemplary wire 600 may be assembled from components, or additionally or alternatively the entire wire or some components may be printed with a 3-D printer. If assembled from components, the components may be machined (e.g., by turning on a lathe).

The exemplary wire 600 may be assembled with a surrounding dielectric layer that is surrounded by a metallic shield to form a coaxial cable. When so assembled, the exemplary wire 600 may form a center conductor of the coaxial cable.

Figure 8:
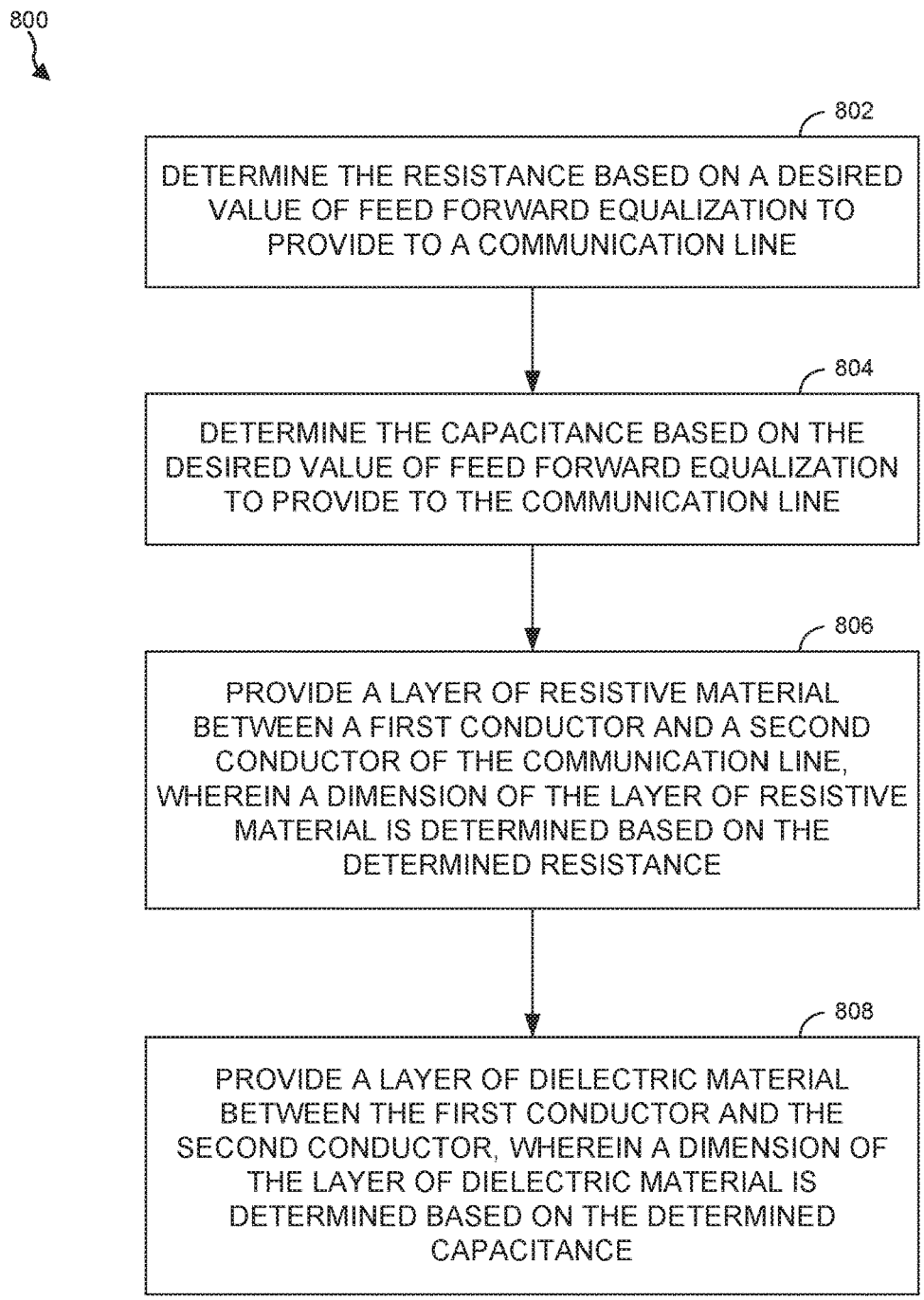
FIG. 8 sets forth exemplary operations for providing feed forward equalization to a communication line, according to aspects of the present disclosure.

FIG. 8 sets forth exemplary operations 800 for providing feed forward equalization to a communication line by providing a resistance and a capacitance to the communication line, according to aspects of the present disclosure. Operations 800 begin at block 802 by determining the resistance based on a desired value of feed forward equalization to provide to a communication line. Operations 800 continue at block 804 by determining the capacitance based on the desired value of feed forward equalization to provide to the communication line. At block 806, operations 800 continue by providing a layer of resistive material between a first conductor and a second conductor of the communication line, wherein a dimension of the layer of resistive material is determined based on the determined resistance. Operations 800 conclude at block 808 by providing a layer of dielectric material between the first conductor and the second conductor, wherein a dimension of the layer of dielectric material is determined based on the determined capacitance.

Figure 9:
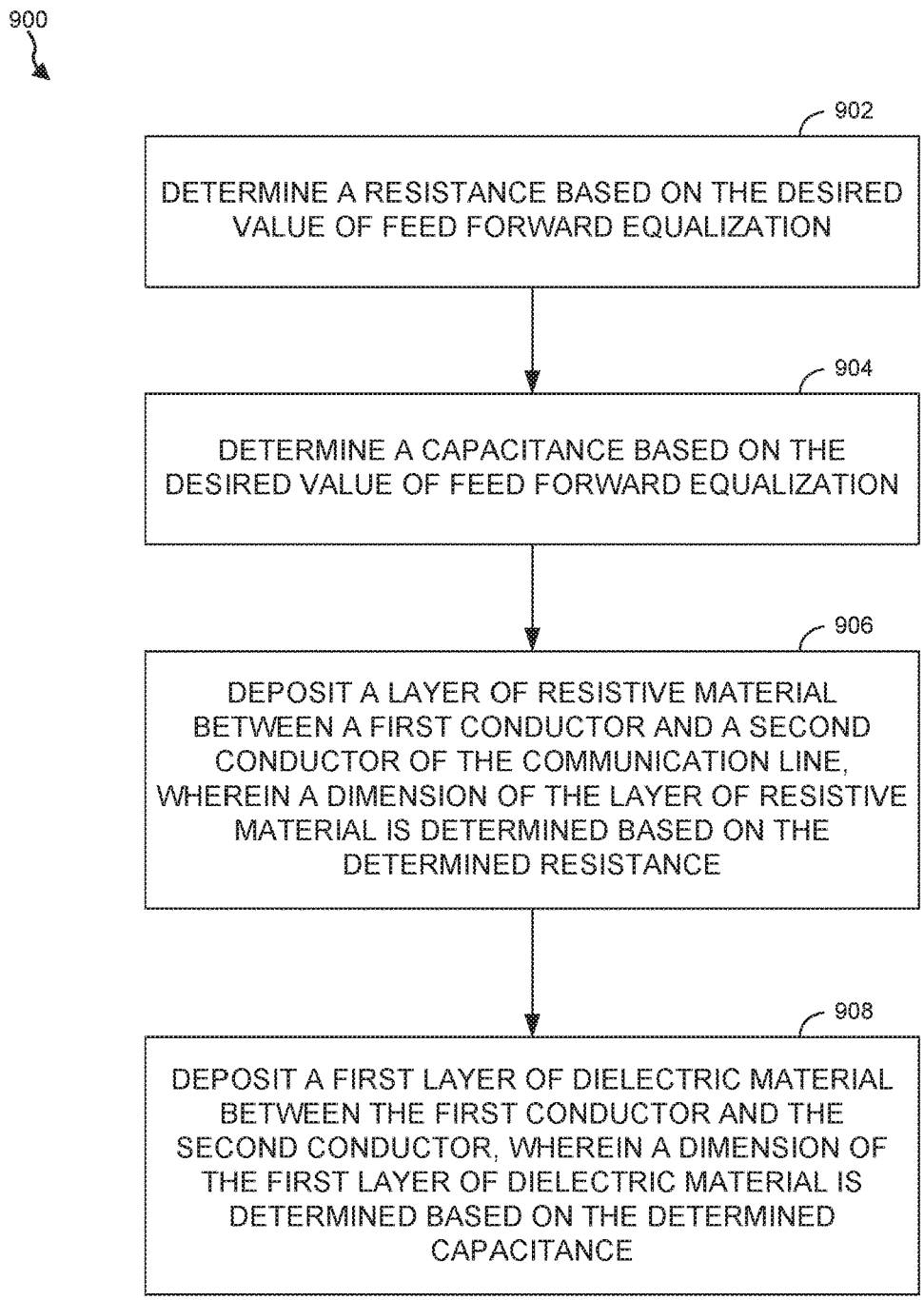
FIG. 9 sets forth exemplary operations for manufacturing a communication line providing a desired value of feed forward equalization, according to aspects of the present disclosure.

FIG. 9 sets forth exemplary operations 900 for manufacturing a communication line providing a desired value of feed forward equalization, according to aspects of the present disclosure. Operations 900 begin at block 902 by determining a resistance based on the desired value of feed forward equalization. Operations 900 continue at block 904 by determining a capacitance based on the desired value of feed forward equalization. At block 906, operations 900 continue by depositing a layer of resistive material between a first conductor and a second conductor of the communication line, wherein a dimension of the layer of resistive material is determined based on the determined resistance. Operations 900 conclude at block 908 by depositing a first layer of dielectric material between the first conductor and the second conductor, wherein a dimension of the layer of dielectric material is determined based on the determined capacitance.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An apparatus for providing feed forward equalization to a communication line, comprising:
a first conductor;

a second conductor that does not contact the first conductor;

a layer of resistive material in contact with the first conductor and in contact with the second conductor, wherein the layer of resistive material has a resistance related to a desired value of the feed forward equalization;

a first layer of a solid dielectric material in contact with the first conductor and in contact with the second conductor, wherein:

at least a portion of the first layer of dielectric material is directly between the first conductor and the second conductor, and the first layer of dielectric material, the first conductor, and the second conductor in combination form a capacitor having a capacitance related to the desired value of the feed forward equalization, wherein the first layer of dielectric material surrounds the layer of resistive material and a portion of at least one of the first conductor or the second conductor; and an insulator disposed between the first conductor and the second conductor, wherein the insulator comprises a material different from the layer of resistive material and different from the first layer of the solid dielectric material.

2. The apparatus of claim 1, wherein the first conductor and the second conductor comprise copper.

3. The apparatus of claim 1, further comprising:

a second layer of dielectric material disposed around the first conductor, the second conductor, the layer of resistive material, and the first layer of dielectric material; and a metallic shield disposed around the second layer of dielectric material.

4. The apparatus of claim 1, wherein the capacitance is between ten and thirty picofarads.

5. The apparatus of claim 1, wherein the resistance is between ten and thirty ohms.

6. A method for providing feed forward equalization to a communication line by providing a resistance and a capacitance to the communication line, comprising:

determining the resistance based on a desired value of the feed forward equalization to provide to the communication line;

determining the capacitance based on the desired value of the feed forward equalization to provide to the communication line;

providing a layer of resistive material between a first conductor and a second conductor of the communication line, wherein a dimension of the layer of resistive material is determined based on the determined resistance;

providing a first layer of a solid dielectric material between the first conductor and the second conductor, wherein:

at least a portion of the first layer of dielectric material is directly between the first conductor and the second conductor, and a dimension of the first layer of dielectric material is determined based on the determined capacitance, and the first layer of dielectric material surrounds the layer of resistive material and a portion of at least one of the first conductor or the second conductor; and providing an insulator disposed between the first conductor and the second conductor, wherein the insulator comprises a material different from the layer of resistive material and different from the first layer of the solid dielectric material.

7. The method of claim 6, wherein the first conductor and the second conductor comprise copper.

8. The method of claim 6, further comprising:

providing a second layer of dielectric material disposed around the first conductor, the second conductor, the layer of resistive material, and the first layer of dielectric material; and providing a metallic shield disposed around the second layer of dielectric material.

9. The method of claim 6, wherein the determined capacitance is between ten and thirty picofarads.

10. The method of claim 6, wherein the determined resistance is between ten and thirty ohms.

11. A method for manufacturing a communication line providing a desired value of feed forward equalization, comprising:

determining a resistance based on the desired value of the feed forward equalization;

determining a capacitance based on the desired value of the feed forward equalization;

depositing a layer of resistive material between a first conductor and a second conductor of the communication line, wherein a dimension of the layer of resistive material is determined based on the determined resistance;

depositing a first layer of a solid dielectric material between the first conductor and the second conductor, wherein:

at least a portion of the first layer of dielectric material is directly between the first conductor and the second conductor, and a dimension of the first layer of dielectric material is determined based on the determined capacitance, and the first layer of dielectric material surrounds the layer of resistive material and a portion of at least one of the first conductor or the second conductor; and depositing a layer of insulating material between the first conductor and the second conductor, wherein the insulating material comprises a material different from the layer of resistive material and different from the first layer of the solid dielectric material.

12. The method of claim 11, wherein the layer of resistive material is deposited via three-dimensional printing.

13. The method of claim 11, wherein the first layer of dielectric material is deposited via three-dimensional printing.

14. The method of claim 11, further comprising:

providing a second layer of dielectric material disposed around the first conductor, the second conductor, the layer of resistive material, and the first layer of dielectric material; and providing a metallic shield disposed around the second layer of dielectric material.

15. The method of claim 11, further comprising:

forming the first conductor by depositing a first quantity of a conductive material; and forming the second conductor by depositing a second quantity of the conductive material.

* * * * *